United States Patent
Kagan

(10) Patent No.: US 10,083,068 B2
(45) Date of Patent: Sep. 25, 2018

(54) FAST TRANSFER OF WORKLOAD BETWEEN MULTIPLE PROCESSORS

(71) Applicant: Microsoft Technology Licensing, LLC, Redmond, WA (US)

(72) Inventor: Oleg Kagan, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 107 days.

(21) Appl. No.: 15/189,868

(22) Filed: Jun. 22, 2016

(65) Prior Publication Data
US 2017/0286186 A1 Oct. 5, 2017

Related U.S. Application Data

(60) Provisional application No. 62/314,713, filed on Mar. 29, 2016.

(51) Int. Cl.
G06F 9/46 (2006.01)
G06F 9/52 (2006.01)
G06F 9/48 (2006.01)

(52) U.S. Cl.
CPC ............ *G06F 9/524* (2013.01); *G06F 9/4812* (2013.01); *G06F 9/4843* (2013.01); *G06F 9/52* (2013.01); *G06F 2209/509* (2013.01)

(58) Field of Classification Search
None
See application file for complete search history.

(56) References Cited

U.S. PATENT DOCUMENTS

| | | | |
|---|---|---|---|
| 5,966,543 A | 10/1999 | Hartner et al. | |
| 6,269,391 B1 | 7/2001 | Gillespie | |
| 6,567,873 B1 | 5/2003 | Henriksen | |
| 7,103,631 B1 | 9/2006 | van der Veen | |
| 7,251,746 B2 | 7/2007 | Fox et al. | |

(Continued)

FOREIGN PATENT DOCUMENTS

WO 20120051972 A2 4/2012

OTHER PUBLICATIONS

PCT/US2017/023924, International Search Report and Written Opinion, dated Jul. 7, 2017, 13 pages.

(Continued)

*Primary Examiner* — Dong Kim
(74) *Attorney, Agent, or Firm* — David W. Foster; Newport IP, LLC

(57) ABSTRACT

Techniques and systems for prescheduling an alternative CPU as soon as a need for a task is detected by a primary CPU are disclosed. A process includes detecting, by a producer thread running on a first CPU, an external interrupt, acquiring, by the producer thread, a spinlock, and in response to acquiring the spinlock, sending, by the producer thread, an event to a consumer thread that is to run on a second CPU. Upon receiving the event by the consumer thread, the consumer thread acquires the spinlock, which "stalls" the consumer thread in a loop until the spinlock is released by the producer thread. While the consumer thread is "waking up" in response to receiving the event from the producer thread, the producer thread creates a task, publishes the task, and releases the spinlock, thereby causing the consumer thread to exit the loop, retrieve the task, and execute the task.

20 Claims, 2 Drawing Sheets

(56) References Cited

U.S. PATENT DOCUMENTS

| | | | |
|---|---|---|---|
| 7,467,267 B1* | 12/2008 | Mayock | G06F 11/1461 |
| | | | 707/999.202 |
| 7,490,325 B2 | 2/2009 | Jackson | |
| 7,861,042 B2 | 12/2010 | Larson et al. | |
| 8,239,866 B2 | 8/2012 | Carrie | |
| 8,261,284 B2 | 9/2012 | Loeser | |
| 8,621,184 B1 | 12/2013 | Radhakrishnan et al. | |
| 8,819,345 B2 | 8/2014 | Zetterman et al. | |
| 9,063,796 B2 | 6/2015 | Giusto et al. | |
| 9,135,085 B2 | 9/2015 | Sasaoka | |
| 9,201,673 B2 | 12/2015 | Chin et al. | |
| 9,286,148 B1* | 3/2016 | Arimilli | G06F 9/546 |
| 2002/0013915 A1* | 1/2002 | Migita | G06F 3/0613 |
| | | | 714/6.13 |
| 2002/0124042 A1* | 9/2002 | Melamed | G01M 15/00 |
| | | | 718/102 |
| 2007/0050527 A1 | 3/2007 | Tuan | |
| 2009/0233622 A1* | 9/2009 | Johnson | H04W 64/00 |
| | | | 455/456.3 |
| 2012/0242672 A1* | 9/2012 | Larson | G06T 1/20 |
| | | | 345/522 |
| 2013/0081060 A1 | 3/2013 | Otenko | |
| 2014/0013330 A1* | 1/2014 | Wang | G06F 9/4856 |
| | | | 718/103 |
| 2014/0068165 A1* | 3/2014 | DeCorte | G06F 9/544 |
| | | | 711/104 |
| 2014/0101411 A1 | 4/2014 | Sakarda | |
| 2016/0154678 A1* | 6/2016 | Vagg | G06F 9/546 |
| | | | 718/104 |

OTHER PUBLICATIONS

"Towards Symmetric Multi-threaded Optimistic Simulation Kernels", Retrieved on: Mar. 11, 2016 Available at: http://www.dis.uniroma1.it/~vitali/pdf/paper/pads_2012.pdf.

* cited by examiner

FAST TRANSFER OF WORKLOAD BETWEEN MULTIPLE PROCESSORS

CROSS REFERENCE TO RELATED APPLICATION

This patent application claims the benefit of U.S. Provisional Patent Application Ser. No. 62/314,713 filed Mar. 29, 2016, entitled "FAST TRANSFER OF WORKLOAD BETWEEN MULTIPLE PROCESSORS", which is hereby incorporated in its entirety by reference.

BACKGROUND

Embedded devices are often built with relatively cheap hardware (e.g., power supplies of limited capacity, slower components that require less energy, etc.). The use of cheaper hardware allows a manufacturer to economically mass produce these embedded devices, but the economic savings come at a cost of degraded performance of the device. For instance, in a multiprocessor system—and in particular, a low-level multiprocessor platform like Raspberry Pi 2, which is used for embedded devices—the architecture can be asymmetrical in the sense that interrupts are delivered exclusively on a primary central processing unit (CPU), rather than load-balanced across multiple available CPUs. This can lead to overutilization of the primary CPU and underutilization of the other CPU(s) in the multiprocessor system. Furthermore, many embedded devices utilize a relatively slow direct memory access (DMA) controller. Oftentimes programmers work around this constraint by designing embedded software to perform memory transfer operations using a CPU in lieu of a slower DMA controller because the memory transfer operations can be performed faster with a CPU. This can put even more of a workload burden on a primary CPU because the primary CPU is fully occupied for the duration of a memory transfer operation and is unavailable to receive interrupts.

Current operating systems can alleviate these problems by scheduling tasks on (or transferring tasks to) an alternative CPU in a multiprocessor system, which reduces some of the burden on a primary CPU. For example, a device driver and/or an operating system (OS) component can transfer a task between CPUs by creating a task with a "producer" thread that runs on a first CPU, and executing the task with a "consumer" thread that runs on a second CPU. However, there is often a significant delay from a time when the producer thread signals to the consumer thread to execute the task, and a time when the consumer thread "wakes up" and is actually ready to execute the task. This delay can be caused by inherent scheduling latency in waking up a consumer thread and preparing the consumer thread to execute the task. For example, the consumer thread takes time to load a stack and multiple pages from system memory in order to prepare itself to execute a task. The time it takes to perform these "load" operations can cause discernable performance degradations. Many embedded devices—such as control devices (e.g., a robotic arm) that perform time-critical operations—could benefit from a higher performance OS.

SUMMARY

Described herein are techniques and systems for prescheduling an alternative CPU as soon as a need for a task is detected by a primary CPU. Prescheduling the alternative CPU can comprise sending an event—to wake up a consumer thread that is to run on the alternative CPU—prior to providing relevant information to the consumer thread that will be utilized for executing the task. Prescheduling the alternative CPU in this manner minimizes, or eliminates, the delay between the moment at which a need for a task arises (is detected) in a producer thread context and the moment at which the task is executed in a consumer thread context, the consumer thread running on an alternative CPU. The reduction, or elimination, of the delay in transferring a task between CPUs can be particularly useful for low-end embedded devices.

In some configurations the consumer thread can be stalled in a non-pre-emptible "spinlock." A spinlock is a synchronization primitive which causes a thread trying to acquire it to wait in a loop ("spin") while repeatedly checking if the spinlock is released (or available to be acquired). Since the thread remains active but is not performing a useful task, the use of such a spinlock is a busy wait state. Accordingly, a process for transferring a task from a first CPU to a second CPU includes utilizing a producer thread running on the first CPU to detect an external interrupt, acquire a spinlock, and in response to acquiring the spinlock, send an event to a consumer thread that is to run on the second CPU. Upon receipt of the event by the consumer thread, the consumer thread acquires the spinlock, which "stalls" the consumer thread in a loop until the spinlock is released by the producer thread. While the consumer thread is "waking up" in response to receiving the event from the producer thread, the producer thread creates a task, publishes the task, and releases the spinlock, thereby causing the consumer thread to exit the loop, retrieve the task, and execute the task.

Improvements in OS performance can be achieved by "prescheduling" the consumer thread as early as possible after a need for executing a task is detected, and thereafter stalling the consumer thread in a non-pre-emptible spinlock until the producer thread publishes the task for consumption. Said another way, the prescheduling of the consumer thread causes the "waking up" operations of the consumer thread to occur in parallel to the operations performed by the producer thread in creating the task and publishing the task for consumption. This prescheduling technique minimizes delays caused by natural scheduling latency. The prescheduling can create a slight additional load on the alternative CPU while the consumer thread is stalled in a loop to acquire the spinlock, but the improved transfer speed between CPUs outweighs the slight additional load experienced on the alternative CPU.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Configurations of the present disclosure are directed to, among other things, techniques and systems for prescheduling an alternative CPU as soon as a need for a task is detected by a primary CPU. By the use of the techniques disclosed herein, one or more devices can be configured to schedule a task on an alternative CPU with improved speed as compared to current approaches to scheduling a task on an alternative CPU. For example, the speed at which a task can be scheduled on (or transferred to) an alternative CPU can be increased by prescheduling the alternative CPU as soon as a need for a task is detected by a primary CPU. Increasing the speed at which workload can be transferred between multiple CPUs can improve the performance of a multiprocessor device.

In some configurations, one or more devices can be configured to conserve resources with respect to power resources, memory resources, communications bandwidth resources, processing resources, and/or other resources while providing mechanisms for prescheduling an alternative CPU. Technical effects other than those mentioned herein can also be realized from an implementation of the technologies disclosed herein. The techniques and systems described herein may be implemented in a number of ways. Example implementations are provided below with reference to the following figures.

Figure 1:
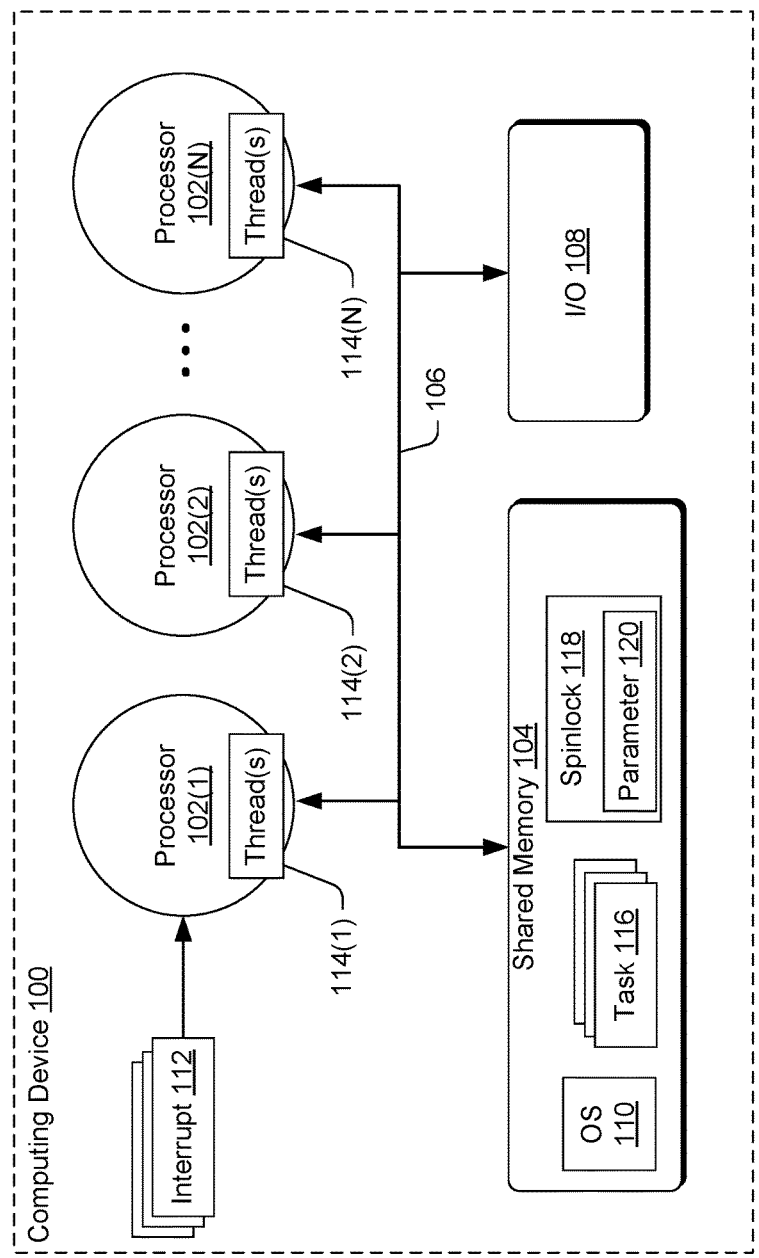
FIG. 1 illustrates an example multiprocessor computing device for implementing the techniques described herein.

FIG. 1 illustrates an example multiprocessor computing device 100 (referred to herein as a "computing device 100") for implementing the techniques described herein. For example, the computing device 100 can represent one or more computing machines, including, without limitation, an embedded device(s), a server(s), a personal computer(s), or any other suitable computing device(s), whether the computing device is mobile or situated. In an illustrative example, the computing device 100 represents an embedded device. Embedded devices can come in a variety of forms, such as, without limitation, a wearable computer, a control device (e.g., a robotic arm), a household appliance (e.g., a kitchen appliance), and the like. The computing device 100 shown in FIG. 1 is merely one example multiprocessor device that can be used to implement the techniques described herein. As such, the techniques described herein are not limited to performance using the computing device 100 of FIG. 1.

The computing device 100 can include a plurality of processors 102(1), 102(2), . . . , 102(N) (collectively 102). An individual processor 102 can represent any suitable type of execution unit, such as a central processing unit (CPU), a core, and/or a node, depending on the implementation details of the computing device 100. For example, any individual processor 102 can represent a single CPU, a node having multiple processors or cores configured to execute separate threads, or any other suitable processor arrangement. In some configurations, individual ones of the processors 102 can each have an associated local cache memory that functions as an intermediary between the processors 102 and a shared memory 104 (e.g., main memory, or system memory).

The shared memory 104, as its name implies, can be shared between the processors 102. Accordingly, a bus 106 can connect the processors 102 to the shared memory 104. In some embodiments, the bus 106 can represent an interconnection network to connect the processors 102 to the shared memory 104, or portions of the shared memory 104. Depending on the exact configuration, the shared memory 104 can be volatile (e.g., random access memory (RAM)), non-volatile (e.g., read only memory (ROM), flash memory, etc.), or some combination of the two. The computing device 100 can further include an input/output (I/O) system 108 including I/O devices and media. In some configurations, the I/O system 108 can comprise embedded devices, and/or peripheral devices. These devices are generally referred to herein as "hardware" of the computing device 100.

The computing device 100 can also include additional data storage devices (removable and/or non-removable) such as, for example, magnetic disks, optical disks, or tape, which are all examples of computer storage media. The shared memory 104 is another example of computer storage media. Computer storage media may include volatile and nonvolatile, removable and non-removable media implemented in any method or technology for storage of information, such as computer readable instructions, data structures, program modules, or other data. Computer storage media includes, but is not limited to, RAM, ROM, electrically erasable programmable read-only memory (EEPROM), flash memory or other memory technology, compact disk read-only memory (CD-ROM), digital versatile disks (DVD), or other optical storage, magnetic cassettes, magnetic tape, magnetic disk storage or other magnetic storage devices, or any other medium which can be used to store the desired information, objects and/or data structures that can be accessed by the computing device 100. Although the description of computer storage media contained herein refers to a mass storage device, such as a solid state drive, a hard disk or CD-ROM drive, it should be appreciated by those skilled in the art that computer-readable media can be any available computer storage media or communication media that can be accessed by the processors 102.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the processors 102 and other components. For purposes of the claims, the phrase "computer storage medium," "computer-readable storage medium" and variations thereof, does not include waves, signals, and/or other transitory and/or intangible communication media, per se.

In some configurations, the shared memory 104 can store programming instructions, data structures, program modules and other data, which, when executed by one or more of the processors 102, implement some or all of the processes described herein. For example, the computing device 100 can include (e.g., within the shared memory 104) an operating system (OS) 110 configured to, among other things, provide programming instructions (or code) for execution by drivers or other OS components in order to implement the "prescheduling" techniques described herein. In general, the OS 110 can include a component-based framework that supports components (including properties and events), objects, inheritance, polymorphism, reflection, and provides an object-oriented component-based application programming interface (API). The operating system 110 can be Windows-based, Unix-based, Linux-based, or any other suitable operating system type.

It is to be appreciated that the "prescheduling" techniques described herein can be implemented through execution of code in a kernel mode of operation. Kernel mode refers to a mode of operation of a computer in which the software program presently being executed is permitted to execute the full instruction set of a processor 102, access all parts of the computer's memory and interact directly with hardware devices attached to a computer (such as the computing device 100). Kernel-mode is typically restricted to software modules that form part of the OS 110 of the computing device 100. Failures of a kernel-mode process can result in the OS 110 crashing and/or corrupt memory for other processes. However, it is also to be appreciated that the "prescheduling" techniques described herein are not limited to implementation in kernel mode, as user mode implementations can also benefit from the prescheduling of an alternative processor 102, as described herein.

FIG. 1 illustrates that a first processor 102(1) is configured to receive interrupts 112. This can be due to the first processor 102(1) being wired in a particular manner so that interrupts 112 are delivered on the processor 102(1). In some configurations, boot code can instruct an interrupt controller to deliver the interrupts 112 to the first processor 102(1). Individual interrupts 112 can occur in response to various types of conditions, such as conditions including, without limitation, when a timer reaches a predefined value or time, when a button on the computing device 100 is pressed, or when data is to be moved/copied to another memory location, and so on. When the first processor 102(1) has sufficient capacity to handle the interrupts 112 (i.e., the first processor 102(1) is not overloaded), the first processor 102(1) can utilize one or more threads 114(1) running on the first processor 102(1) to carry out the execution of tasks 116 corresponding to the received interrupts 112. For example, the thread(s) 114(1) can run on the first processor 102(1) to create a task 116 and execute the task 116 in response to an interrupt 112 delivered to the processor 102(1). A task 116 can include any suitable task, such as tasks including, without limitation, moving or copying data, performing calculations, signaling to hardware, reading an object (e.g., copy or print the object), modifying an object, and so on.

When the number or frequency of interrupts 112 increases and/or the tasks 116 become relatively lengthy (i.e., a high amount of bytes), the first processor 102(1) can become overloaded. In this scenario, a driver and/or kernel-mode OS component can execute code in the OS 110 to schedule one or more tasks 116 on an alternative processor 102, such as the second processor 102(2) or the Nth processor 102(N). Scheduling (or transferring) tasks 116 between multiple processors 102 can be formulated in terms of a "producer" thread that creates a task 116 when a need for the task 116 arises (is detected), and a "consumer" thread that executes the task 116. The consumer thread can also be referred to herein as a "worker" thread.

When an interrupt 112 is detected by the first processor 102(1), the OS 110 (e.g., via a driver or other OS component) can "wake up," or otherwise invoke, a producer thread 114(1) running on the first processor 102(1). The producer thread 114(1) can then acquire a spinlock 118. A spinlock 118 is a type of synchronization primitive that can be employed by the OS 110 to avoid race conditions. Race conditions occur when multiple threads 114 access and manipulate the same object or data structure at the same time, which can result in flawed data. Synchronization primitives, in general terms, can enforce a policy that prevents a thread 114 from exclusively accessing an object before another thread 114 is finished accessing the object. Enforcement of this policy synchronizes the threads' 114 access to the object by managing concurrent interactions of the threads 114, thus avoiding race conditions.

The data structure of the spinlock 118 can include a spinlock parameter 120 (or spinlock variable 120) that can be set to (or toggled between) multiple different values indicating that the spinlock 118 has been acquired or released. In an illustrative example, the producer thread 114(1) can carry out an "exclusive" acquire of the spinlock 118 by, for example, setting the spinlock parameter 120 (e.g., by setting a bit in a corresponding data field) to a particular value (e.g., a value of "1"), which acts to notify other threads 114 that they must wait until the spinlock 118 is released before the spinlock 118 can be acquired.

After the producer thread 114(1) acquires the spinlock 118, the producer thread 114(1) can send an event to a consumer thread 114(2) that is to run on the second processor 102(2) in order to "wake up" the consumer thread 114(2). In this manner, the second processor 102(2), which represents an "alternative" processor/CPU 102 can be "prescheduled" as soon as a need for a task is detected by the first processor 102(1).

After sending the event to the consumer thread 114(2), the producer thread 114(1) proceeds to create a task 116 corresponding to the detected interrupt 112. For example, the task 116 can comprise a memory transfer operation where data is to be copied/moved from one memory location to another. The producer thread 114(1) can publish the task 116 for consumption by storing the task 116 in the shared memory 104. "Publishing" the task 116 can therefore comprise storing the task 116 in the shared memory 104 such that the task 116 is accessible to the first processor 102(1) via the producer thread 114(1) and to the second processor 102(2) via the consumer thread 114(2). In some configurations, publishing the task 116 comprises placing the task 116 in a queue of tasks 116 that are to be consumed by consumer threads 114.

In response to publishing the task 116, the producer thread 114(1) can release the spinlock 118 by setting (or toggling) the spinlock parameter 120 back to a particular value (e.g., a value of "0"), which acts to notify other threads 114 that the spinlock 118 has been released.

Meanwhile, as soon as the event is received by the consumer thread 114(2) from the producer thread 114(1), the OS 110 "wakes up" the consumer thread 114(2). Waking up the consumer thread 114(2) can involve various "load" operations that take some time to perform, such as loading a stack, loading pages, etc., so that the consumer thread 114(2) is prepared to execute the task 116 being created by the producer thread 114(1). Notably, these "load" operations to "wake up" the consumer thread 114(2) are performed in parallel to the operations performed by the producer thread 114(1) to create the task 116 and publish the task 116 for consumption, thereby minimizing, or eliminating, any delay due to the inherent scheduling latency involved in transferring a task to the second processor 102(2).

As soon as the consumer thread 114(2) "wakes up" and is ready to execute the task 116, the consumer thread 114(2)

acquires the spinlock 118. In one scenario, the producer thread 114(1) will have already released the spinlock 118 by the time the consumer thread 114(2) acquires the spinlock 118, in which case, the consumer thread 114(2) checks the spinlock parameter 120, sees that it is set to the particular value (e.g., "0") indicating that the spinlock 118 is released, and acquires the spinlock 118 by setting/toggling the spinlock parameter 120 to the particular value (e.g., "1") indicating to other threads 114 that the spinlock 118 is acquired.

In another scenario, the producer thread 114(1) will still be performing operations to create the task 116 and/or publish the task 116 for consumption at the time the consumer thread 114(2) is ready to execute the task 116 and acquires the spinlock 118. In this scenario, the consumer thread 114(2), in acquiring the spinlock 118, checks the spinlock parameter 120, sees that it is set to the particular value (e.g., "1") indicating that the spinlock 118 is not yet released, and iteratively "spins" (or "rotates" or "loops") by iteratively checking the value of the spinlock parameter 120 until the value is toggled back to the particular value (e.g., "0") indicating that the spinlock 118 is released. Upon determining that the spinlock 118 is released, the consumer thread 114(2) exits the "loop" and acquires the spinlock 118 by setting/toggling the spinlock parameter 120 to the particular value (e.g., "1") indicating to other threads 114 that the spinlock 118 is acquired.

In either scenario, after acquiring the spinlock 118, the consumer thread 114(2) can retrieve the task 116 that has now been published by the producer thread 114(1), and can execute the task 116 on behalf of the producer thread 114(1) to alleviate at least some of the workload burden on the first processor 102(1). Improvements in OS 110 performance can be achieved by "prescheduling" the consumer thread 114(2) in this manner (i.e., as early as possible after a need for executing a task 116 is detected at the first processor 102(1)), and thereafter stalling the consumer thread 114(2) in a non-pre-emptible spinlock 118 until the producer thread 114(1) publishes the task 116 for consumption and releases the spinlock 118. Example pseudo code for prescheduling the consumer thread 114(2) as described herein is presented below:

OsEvent SharedEvent;
int SpinLock;
TaskDescriptor SharedTaskDescriptor;
Consumer:
WaitFor(SharedEvent); // [C1]
while (SpinLock==1) {}; // AcquireSpinLock [C2]
ExecuteTask(SharedDescriptor); // [C3]
Producer:
task=CreateTask(); // [P1] Need for operation arises
SpinLock=1; // [P2] AcquireSpinLock
SignalEvent(SharedEvent); // [P3] Signal event for Consumer to start execution
SharedTaskDescriptor=CreateTaskDescriptor(Task); // [P4] Fill descriptor for Consumer
SpinLock=0; // [P5] ReleaseSpinLock It is to be appreciated that, although a spinlock 118 is shown in FIG. 1 as an example synchronization primitive, any other suitable type of synchronization primitive can be utilized in lieu of the spinlock 118, such as a waitlock, a rundown reference, a mutex, and so on. For example, a waitlock parameter/variable can be set to a particular value (e.g., "0") so that the consumer thread 114(2) is placed in a queue of "waiting" threads 114. When the waitlock parameter is set/toggled to another particular value (e.g., "1"), the OS 110 can issue a callback to the consumer thread 114(2) that is registered for the waitlock parameter. As compared to the use of the spinlock 118, using a waitlock doesn't add any additional workload to the second processor 102(2), but the queue of waiting threads 114 consumes a small amount of memory. Furthermore, it may take more time to "wake up" the consumer thread 114(2) from the waitlock context as compared to the time it takes for the consumer thread 114(2) to exit the spinlock 118 loop.

In some configurations, the OS 110 can select the second processor 102(2) among multiple available processors 102 based on an assessment of available capacity on the multiple available processors 102 other than the first processor 102(1). For example, the OS 110 can determine that both the second processor 102(2) and the Nth processor 102(N) are free (i.e., they have capacity), determine that the second processor 102(2) has more capacity than the Nth processor 102(N), and select the second processor 102(2) for executing the consumer thread 114(2).

In some configurations, the OS 110 can provide multiple producer threads 114(1) to be run on the first processor 102(1) in response to interrupts 112 detected at the first processor 102(1). In this case, a first producer thread 114 in the pool of producer threads 114(1) can acquire the spinlock 118 in response to detecting the interrupts 112, and after acquiring the spinlock 118, the first producer thread 114 can send a semaphore with a count that corresponds to a number of consumer threads 114 that are needed to execute multiple tasks 116 corresponding to the received interrupts 112. For example, if the semaphore is set to a count=3, the OS 110 can wake up a first consumer thread 114 to be run on another processor, such as the second processor 102(2), and decrement the semaphore count to count=2, and then wake up a second consumer thread 114 to be run on another processor, such as the Nth processor 102(N), and decrement the semaphore count to count=1, and then wake up a third consumer thread 114 to be run on another processor, such as the second processor 102(2), and decrement the semaphore count to count=0. The consumer threads 114 can acquire the spinlock 118 upon its release by the first producer thread 114 so that the pool of consumer threads 114 can execute respective transferred tasks 116 on one or more alternative processors 102 (i.e., processors 102 other than the first processor 102(1)). Thus, using pools of threads 114 and a semaphore that is sent in response to acquiring the spinlock 118 can widen the "pipe" of consumer threads 114 to transfer multiple tasks 116 for execution on alternative processor(s) 102. In this scenario, the pool of consumer threads 114 can acquire the spinlock 118 in a shared manner so that the pool of consumer threads 114 can simultaneously hold the spinlock 118. When the spinlock 118 is acquired in a shared manner, other threads 114 that are trying to obtain an exclusive acquire of the spinlock 118 would be prevented from doing so.

Figure 2:
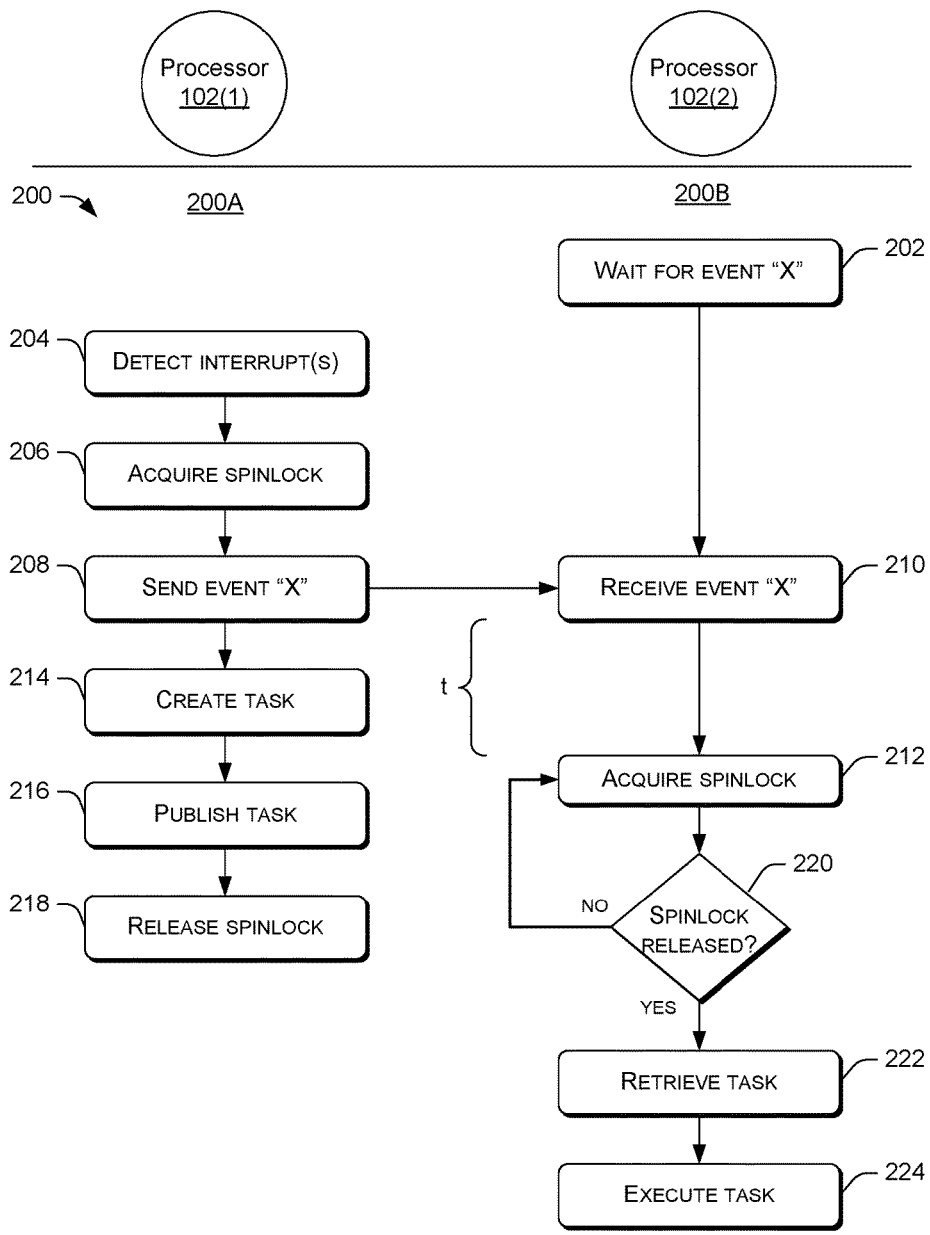
FIG. 2 is a flow diagram of an illustrative process for prescheduling an alternative CPU.

FIG. 2 is a flow diagram of an illustrative process 200 for prescheduling an alternative CPU. The process 200 is illustrated as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 200.

For discussion purposes, the process 200 is described with reference to the multiprocessor computing device 100 of FIG. 1. Furthermore, the process 200 illustrates a scenario of transferring a task 116 from a first processor 102(1) to a second processor 102(2), such that the process 200 is broken down into sub-processes 200A and 200B for the first processor 102(1) and the second processor 102(2), respectively.

Initially, at 202 of the sub-process 200B, the second processor 102(2) can wait for receipt of an event (e.g., event "X") by sitting/idling in a "wait" state. In some configurations, the second processor 102(2) executes a "wait for event 'X'" instruction to remain in a wait state until the event "X" is received at the second processor 102(2). The waiting at 202 can occur before any external interrupts 112 are delivered on the first processor 102(1). The waiting at 202 can be represented in the example pseudo code as: WaitF or(SharedEvent); // [C1].

At 204 of the sub-process 200A, one or more interrupts 112 are detected. For example, if the OS 110 determines that a button is pressed, a timer reaches a threshold, or some other external condition is satisfied (e.g., data is ready to be moved between memory locations), an interrupt 112 is delivered on the first processor 102(1), which "wakes up" a producer thread 114(1) to run on the first processor 102(1). Thus, the producer thread 114(1) can be said to have "detected" the interrupt 112 if it is invoked in response to the interrupt 112 being delivered on the first processor 102(1). Step 204 is the point at which a need for a task 116 arises, and it can be represented in the pseudo code as: task=CreateTask( ); // [P1] Need for operation arises.

In some configurations, the OS 110 can determine whether a task 116 corresponding to the interrupt 112 is to be transferred (or offloaded) to another processor, such as the second processor 102(2). This determination can involve assessing a current workload of the first processor 102(1) and determining whether the current workload is above a threshold level. If the current workload is below a threshold level, a task 116 corresponding to the interrupt 112 detected at 204 can be executed by a thread 114 running on the first processor 102(1) because the first processor 102(1) may have capacity to execute the task 116. If, on the other hand, the current workload is at or above the threshold level, the OS 110 can carry out the remainder of the process 200 to transfer the task 116 to an alternative processor 102(2).

At 206, the producer thread 114(1) running on the first processor 102(1) can acquire a spinlock 118 by setting a spinlock parameter 120 to a particular value (e.g., "1") to indicate to other threads 114 that they have to wait until the spinlock 118 is released in order to acquire the spinlock 118. In some configurations, the acquiring of the spinlock 118 at 206 is in the form of an "exclusive" acquire such that the producer thread 114(1) is the sole owner of the spinlock 118. It is to be appreciated that the spinlock parameter 120 can be set to a "release" value by default so that it is acquirable by the producer thread 114(1) at 206. Acquiring the spinlock 118 at 206 synchronizes the threads 114 involved in the workload transfer process, and it can be represented in the pseudo code as: SpinLock=1; // [P2] AcquireSpinLock.

At 208, in response to acquiring the spinlock 118 at 206, the producer thread 114(1) can send an event (e.g., event "X"). At 210, the event (e.g., event "X") is received by a consumer thread 114(2) running on the second processor 102(2). Accordingly, the event that is sent at 208 and received at 210 can effectively "wake up" a consumer thread 114(2) to be run on the second processor 102(2). At 208, the producer thread 114(1) running on the first processor 102(1) knows that there will be a task 116 to be executed, but it may not know the details of the to-be-created task 116; the producer thread 114(1) may just know that the consumer thread 114(2) should be "woken up" to preschedule the second processor 102(2) so that the to-be-created task 116 can be executed by the consumer thread 114(2) as soon as the task 116 is published for consumption. The sending of the event (e.g., event "X") at 208 can be represented in the pseudo code as: SignalEvent(SharedEvent); // [P3] Signal event for Consumer to start execution.

Upon receipt of the event (e.g., event "X") at 210, the consumer thread 114(2) running on the second processor 102(2) wakes up by performing one or more "load" operations. These load operations take time to perform, which is shown in FIG. 2 as the time period, t, starting at 210 and ending at 212 when the consumer thread 114(2) is awake and ready to acquire the spinlock 118. This time period, t, can be due to inherent scheduling latency to perform "load" operations like loading a stack and loading pages to prepare the consumer thread 114(2) to execute a task 116.

In the sub-process 200A—and in parallel to the operations performed in the sub-process 200B during the time period, t, when the consumer thread 114(2) is waking up—the producer thread 114(1) can create a task 116 at 214. The task 116 created at 214 can correspond to the detected interrupt 112 and can represent any suitable task, as described herein and/or known to a person having ordinary skill in the art. For example, the task 116 can comprise a memory transfer operation to move/copy data from one memory location to another memory location. In some configurations, the producer thread 114(1) can also allocate memory where the consumer thread 114(2) is to copy/move data, determine addresses where data is to be moved, perform mathematical operations, and so on.

At 216, the producer thread 114(1) can publish the task 116 for consumption. As described herein, publishing the task 116 at 216 can include storing the task 116 in the shared memory 104, thereby making the task 116 accessible to the consumer thread 114(2) running on the second processor 102(2). Publishing the task 116 at 216 can be represented in the pseudo code as: SharedTaskDescriptor CreateTaskDescriptor(Task); // [P4] Fill descriptor for Consumer.

At 218, the producer thread 114(1) can release the spinlock 118 by setting/toggling the spinlock parameter 120 to a value that indicates to other threads 114 that the spinlock 118 is released and available for acquisition. In some configurations, the releasing of the spinlock 118 at 218 can occur in response to publishing the task 116 at 216. Releasing the spinlock 118 at 218 can be represented in the pseudo code as: SpinLock=0; // [P5] ReleaseSpinLock.

Meanwhile, in the sub-process 200B, after the time period, t, has lapsed and the consumer thread 114(2) is prepared to execute the task 116 created at 214, the consumer thread 114(2) acquires the spinlock 118 at 212. Acquiring the spinlock at 212 can involve checking the value of the spinlock parameter 120 at decision block 220, and can be represented in the pseudo code as: while (SpinLock==1) { }; // AcquireSpinLock [C2]. If the value of the spinlock parameter 120 indicates that the spinlock 118 has not been released (e.g., spinlock=1), the sub-process 200B iterates back to 212 by following the "no" route from 220. Iterating in this manner effectively stalls the consumer thread 114 in a "spinning" or "rotating" state until the spinlock 118 is released. As soon as the spinlock 118 is released at 218 of the sub-process 200A, the determination at 220 that occurs subsequent to the release of the spinlock 118 at 218 follows the "yes" route and the consumer thread 114(2) exits the loop to acquire the spinlock 118, retrieve the task 116 at 222 from the shared memory 104, and execute the task 116 at 224. Retrieving and executing the task 116 at steps 222 and 224 can be represented in the pseudo code as: ExecuteTask(SharedDescriptor); // [C3].

The process 200 can be expanded for use with pools of threads 114 and for execution of multiple tasks 116 in parallel by executing the tasks 116 on multiple consumer threads 114 running on one or more alternative processors 102 (i.e., processors 102 other than the first processor 102(1) on which the interrupt(s) 112 is delivered). For example, multiple interrupts 112 can be detected at 204, in which case, the spinlock 118 is acquired at 206, and a semaphore is sent at 208, which causes a pool of consumer threads 114 to be woken up at 210. A pool of producer threads 114 running on the first processor 102(1) can create a set of tasks 116 at 214 that correspond to the multiple interrupts 112 detected at 204, and can publish the set of tasks 116 at 216. Meanwhile, the pool of consumer threads 114 can be stalled by iterating from 220 to 212 over the "no" path until the spinlock 118 is released at 218, and then the pool of consumer threads 114 can retrieve their respective tasks 116 at 222 and execute the respective tasks 116 at 224.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

EXAMPLE ONE

A method comprising: detecting, by a producer thread running on a first processor, an external interrupt; acquiring, by the producer thread, a spinlock; in response to acquiring the spinlock, sending, by the producer thread, an event; creating, by the producer thread, a task; publishing, by the producer thread, the created task; in response to publishing the created task, releasing, by the producer thread, the spinlock; in response to releasing the spinlock, retrieving, by a consumer thread running on a second processor, the published task; and executing, by the consumer thread, the retrieved task.

EXAMPLE TWO

The method of Example One, further comprising: prior to retrieving the task, receiving, by the consumer thread, the event; and in response to receiving the event, acquiring, by the consumer thread, the spinlock.

EXAMPLE THREE

The method of any of the previous examples, alone or in combination, wherein the consumer thread acquires the spinlock prior to the producer thread releasing the spinlock, and wherein acquiring, by the consumer thread, the spinlock comprises iteratively checking, by the consumer thread, a value of a spinlock parameter associated with the spinlock.

EXAMPLE FOUR

The method of any of the previous examples, alone or in combination, wherein the consumer thread acquires the spinlock after the producer thread releases the spinlock.

EXAMPLE FIVE

The method of any of the previous examples, alone or in combination, wherein: the consumer thread is one of multiple consumer threads in a pool of consumer threads; the producer thread is one of multiple producer threads in a pool of producer threads; the task is one of multiple tasks; and the event comprises a semaphore having a count equal to a number of the multiple consumer threads in the pool of consumer threads.

EXAMPLE SIX

The method of any of the previous examples, alone or in combination, wherein publishing the task comprises storing information to be utilized for executing the task in shared memory that is accessible to the second processor via the consumer thread.

EXAMPLE SEVEN

The method of any of the previous examples, alone or in combination, further comprising performing, by the consumer thread, loading operations while the producer thread creates the task and publishes the task, wherein the loading operations: prepare the consumer thread to execute the task; and are performed based at least in part on receipt of the event by the consumer thread.

EXAMPLE EIGHT

A system comprising: multiple processors (e.g., central processing units (CPUs), cores, and/or nodes, etc.) including a first processor and a second processor; and memory (e.g., RAM, ROM, EEPROM, flash memory, etc.) storing computer-executable instructions that, when executed by at least one processor of the multiple processors, cause the at least one processor to perform operations comprising: executing, by the second processor, an instruction causing the second processor to wait for an event; executing a producer thread on the first processor based at least in part on an interrupt detected by the first processor; setting, by the producer thread, a parameter associated with a synchronization primitive to a first value; in response to setting the parameter to the first value, sending, by the producer thread, the event to the second processor; executing a consumer thread on the second processor based at least in part on the second processor receiving the event; performing, by the consumer thread, loading operations while the producer thread creates a task; publishing, by the producer thread, the task for consumption; setting, by the producer thread, the parameter to a second value; in response to setting the parameter to the second value, retrieving, by the consumer thread, the task; and executing, by the consumer thread, the task.

EXAMPLE NINE

The system of Example Eight, wherein the synchronization primitive comprises a spinlock.

EXAMPLE TEN

The system of any of the previous examples, alone or in combination, the operations further comprising: iteratively checking, by the consumer thread, the parameter associated with the spinlock to determine whether the parameter has been set to the second value; and in response to the producer thread setting the parameter to the second value, acquiring, by the consumer thread, the spinlock.

EXAMPLE ELEVEN

The system of any of the previous examples, alone or in combination, wherein: the consumer thread is one of multiple consumer threads in a pool of consumer threads; the producer thread is one of multiple producer threads in a pool of producer threads; the task is one of multiple tasks; and the event comprises a semaphore having a count equal to a number of the multiple consumer threads in the pool of consumer threads.

EXAMPLE TWELVE

The system of any of the previous examples, alone or in combination, wherein the synchronization primitive comprises a spinlock, the operations further comprising, in response to the producer thread setting the parameter to the second value, acquiring, by the pool of consumer threads, the spinlock in a shared manner.

EXAMPLE THIRTEEN

The system of any of the previous examples, alone or in combination, wherein: the multiple processors include a third processor; a first subset of the multiple consumer threads execute on the second processor; and a second subset of the multiple consumer threads execute on the third processor.

EXAMPLE FOURTEEN

One or more computer-readable storage media (e.g., RAM, ROM, EEPROM, flash memory, etc.) storing computer-executable instructions that, when executed by a processor (e.g., a central processing unit (CPU), a core, and/or a node, etc.), cause the processor to perform operations comprising: detecting, by a producer thread running on a first processor, an external interrupt; acquiring, by the producer thread, a spinlock; in response to acquiring the spinlock, sending, by the producer thread, an event; creating, by the producer thread, a task; publishing, by the producer thread, the created task; in response to publishing the created task, releasing, by the producer thread, the spinlock; in response to releasing the spinlock, retrieving, by a consumer thread running on a second processor, the published task; and executing, by the consumer thread, the retrieved task.

EXAMPLE FIFTEEN

The one or more computer-readable storage media of Example Fourteen, the operations further comprising: prior to retrieving the task, receiving, by the consumer thread, the event; and in response to receiving the event, acquiring, by the consumer thread, the spinlock.

EXAMPLE SIXTEEN

The one or more computer-readable storage media of any of the previous examples, alone or in combination, wherein the consumer thread acquires the spinlock prior to the producer thread releasing the spinlock, and wherein acquiring, by the consumer thread, the spinlock comprises iteratively checking, by the consumer thread, a value of a spinlock parameter associated with the spinlock.

EXAMPLE SEVENTEEN

The one or more computer-readable storage media of any of the previous examples, alone or in combination, wherein the consumer thread acquires the spinlock after the producer thread releases the spinlock.

EXAMPLE EIGHTEEN

The one or more computer-readable storage media of any of the previous examples, alone or in combination, wherein: the consumer thread is one of multiple consumer threads in a pool of consumer threads; the producer thread is one of multiple producer threads in a pool of producer threads; the task is one of multiple tasks; and the event comprises a semaphore having a count equal to a number of the multiple consumer threads in the pool of consumer threads.

EXAMPLE NINETEEN

The one or more computer-readable storage media of any of the previous examples, alone or in combination, wherein publishing the task comprises storing information to be utilized for executing the task in shared memory that is accessible to the second processor via the consumer thread.

EXAMPLE TWENTY

The one or more computer-readable storage media of any of the previous examples, alone or in combination, the operations further comprising performing, by the consumer thread, loading operations while the producer thread creates the task and publishes the task, wherein the loading operations: prepare the consumer thread to execute the task; and are performed based at least in part on receipt of the event by the consumer thread.

EXAMPLE TWENTY-ONE

A method comprising: detecting, by a producer thread running on a first processor, an external interrupt; setting, by the producer thread, a parameter associated with a spinlock to a first value; in response to setting the parameter to the first value, sending, by the producer thread, an event; performing, by a consumer thread running on a second processor, loading operations while the producer thread creates a task; publishing, by the producer thread, the created task; in response to publishing the created task, setting, by the producer thread, the parameter to a second value; setting, by the consumer thread, the parameter to the first value; retrieving, by the consumer thread, the published task; and executing, by the consumer thread, the retrieved task.

EXAMPLE TWENTY-TWO

The method of Example Twenty-One wherein the consumer thread performs the loading operations in response to receiving the event from the producer thread.

EXAMPLE TWENTY-THREE

The method of any of the previous examples, alone or in combination, further comprising iteratively checking, by the consumer thread and prior to the producer thread setting the parameter to the second value, the parameter to determine whether the parameter has been set to the second value, wherein the consumer thread sets the parameter to the first value in response to determining that the parameter has been set to the second value.

EXAMPLE TWENTY-FOUR

The method of any of the previous examples, alone or in combination, wherein: the consumer thread is one of multiple consumer threads in a pool of consumer threads; the producer thread is one of multiple producer threads in a pool of producer threads; the task is one of multiple tasks; and the event comprises a semaphore having a count equal to a number of the multiple consumer threads in the pool of consumer threads.

EXAMPLE TWENTY-FIVE

The method of any of the previous examples, alone or in combination, wherein: a first subset of the multiple consumer threads execute on the second processor; and a second subset of the multiple consumer threads execute on a third processor.

EXAMPLE TWENTY-SIX

The method of any of the previous examples, alone or in combination, wherein publishing the task comprises storing information to be utilized for executing the task in shared memory that is accessible to the second processor via the consumer thread.

EXAMPLE TWENTY-SEVEN

The method of any of the previous examples, alone or in combination, wherein: setting the parameter to the first value acquires the spinlock; and setting the parameter to the second value releases the spinlock.

EXAMPLE TWENTY-EIGHT

A system comprising: multiple means for executing computer-executable instructions (e.g., central processing units (CPUs), cores, and/or nodes, etc.), the multiple means for executing including a first means for executing and a second means for executing; and means for storing (e.g., RAM, ROM, EEPROM, flash memory, etc.) the computer-executable instructions that, when executed by at least one means for executing of the multiple means for executing, cause the at least one means for executing to perform operations comprising: executing, by the second means for executing, an instruction causing the second means for executing to wait for an event; executing a producer thread on the first means for executing based at least in part on an interrupt detected by the first means for executing; setting, by the producer thread, a parameter associated with a synchronization primitive to a first value; in response to setting the parameter to the first value, sending, by the producer thread, the event to the second means for executing; executing a consumer thread on the second means for executing based at least in part on the second means for executing receiving the event; performing, by the consumer thread, loading operations while the producer thread creates a task; publishing, by the producer thread, the task for consumption; setting, by the producer thread, the parameter to a second value; in response to setting the parameter to the second value, retrieving, by the consumer thread, the task; and executing, by the consumer thread, the task.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A method comprising:
   detecting, by a producer thread running on a first processor, an external interrupt;
   acquiring, by the producer thread, a spinlock;
   in response to acquiring the spinlock, sending, by the producer thread, an event to the consumer thread;
   while the consumer thread wakes up:
      creating, by the producer thread, a task, and
      publishing, by the producer thread, the created task;
   in response to publishing the created task, releasing, by the producer thread, the spinlock;
   in response to releasing the spinlock, retrieving, by a consumer thread running on a second processor, the published task; and
   executing, by the consumer thread, the retrieved task.
2. The method of claim 1, further comprising:
   prior to retrieving the task, receiving, by the consumer thread, the event; and
   in response to receiving the event, acquiring, by the consumer thread, the spinlock.
3. The method of claim 2, wherein the consumer thread acquires the spinlock prior to the producer thread releasing the spinlock, and wherein acquiring, by the consumer thread, the spinlock comprises iteratively checking, by the consumer thread, a value of a spinlock parameter associated with the spinlock.
4. The method of claim 2, wherein the consumer thread acquires the spinlock after the producer thread has already released the spinlock.
5. The method of claim 1, wherein:
   the consumer thread is one of multiple consumer threads in a pool of consumer threads;
   the producer thread is one of multiple producer threads in a pool of producer threads;
   the task is one of multiple tasks; and
   the event comprises a semaphore having a count equal to a number of the multiple consumer threads in the pool of consumer threads.
6. The method of claim 1, wherein publishing the task comprises storing information to be utilized for executing the task in shared memory that is accessible to the second processor via the consumer thread.
7. The method of claim 1, further comprising performing, by the consumer thread, loading operations while the producer thread creates the task and publishes the task, wherein the loading operations:
   prepare the consumer thread to execute the task; and
   are performed based at least in part on receipt of the event by the consumer thread.
8. A system comprising:
   multiple processors including a first processor and a second processor; and memory storing computer-executable instructions that, when executed by at least one processor of the multiple processors, cause the at least one processor to perform operations comprising:
   executing, by the second processor, an instruction causing the second processor to wait for an event;
   executing a producer thread on the first processor based at least in part on an interrupt detected by the first processor;
   when the interrupt is detected, setting, by the producer thread, a parameter associated with a synchronization primitive to a first value;
   in response to setting the parameter to the first value, sending, by the producer thread, the event to the second processor;
   executing a consumer thread on the second processor based at least in part on the second processor receiving the event;
   performing, by the consumer thread, loading operations;
   while the consumer thread performs the loading operations:
     creating, by the producer thread, a task,
     publishing, by the producer thread, the task for consumption, and
     in response to publishing the task for consumption, setting, by the producer thread, the parameter to a second value;
   in response to setting the parameter to the second value, retrieving, by the consumer thread, the task; and
   executing, by the consumer thread, the task.

9. The system of claim 8, the operations further comprising:
   iteratively checking, by the consumer thread, the parameter associated with the spinlock to determine whether the parameter has been set to the second value; and
   in response to the producer thread setting the parameter to the second value, acquiring, by the consumer thread, the spinlock.

10. The system of claim 8, wherein:
   the consumer thread is one of multiple consumer threads in a pool of consumer threads;
   the producer thread is one of multiple producer threads in a pool of producer threads;
   the task is one of multiple tasks; and
   the event comprises a semaphore having a count equal to a number of the multiple consumer threads in the pool of consumer threads.

11. The system of claim 10, wherein the synchronization primitive comprises a spinlock, the operations further comprising, in response to the producer thread setting the parameter to the second value, acquiring, by the pool of consumer threads, the spinlock in a shared manner.

12. The system of claim 10, wherein:
   the multiple processors include a third processor;
   a first subset of the multiple consumer threads execute on the second processor; and
   a second subset of the multiple consumer threads execute on the third processor.

13. A method comprising:
   detecting, by a producer thread running on a first processor, an external interrupt;
   setting, by the producer thread, in response to the external interrupt, a parameter associated with a spinlock to a first value;
   in response to setting the parameter to the first value, sending, by the producer thread, an event to a consumer thread running on a second processor;
   performing, by the consumer thread, loading operations;
   while the consumer thread performs the loading operations:
     creating, by the producer thread, a task,
     publishing, by the producer thread, the created task, and
     in response to publishing the created task, setting, by the producer thread, the parameter to a second value;
   setting, by the consumer thread, the parameter to the first value;
   retrieving, by the consumer thread, the published task; and
   executing, by the consumer thread, the retrieved task.

14. The method of claim 13, wherein the consumer thread performs the loading operations in response to receiving the event from the producer thread.

15. The method of claim 13, further comprising iteratively checking, by the consumer thread and prior to the producer thread setting the parameter to the second value, the parameter to determine whether the parameter has been set to the second value, wherein the consumer thread sets the parameter to the first value in response to determining that the parameter has been set to the second value.

16. The method of claim 13, wherein:
   the consumer thread is one of multiple consumer threads in a pool of consumer threads;
   the producer thread is one of multiple producer threads in a pool of producer threads;
   the task is one of multiple tasks; and
   the event comprises a semaphore having a count equal to a number of the multiple consumer threads in the pool of consumer threads.

17. The method of claim 16, wherein:
   a first subset of the multiple consumer threads execute on the second processor; and
   a second subset of the multiple consumer threads execute on a third processor.

18. The method of claim 13, wherein publishing the task comprises storing information to be utilized for executing the task in shared memory that is accessible to the second processor via the consumer thread.

19. The method of claim 13, wherein:
   setting the parameter to the first value acquires the spinlock; and
   setting the parameter to the second value releases the spinlock.

20. The system of claim 8, wherein setting, by the producer thread, the parameter to the second value comprises the producer thread releasing the synchronization primitive, wherein retrieving, by the consumer thread, the task, is performed in response to the consumer thread acquiring the synchronization primitive, and wherein the producer thread has released the synchronization primitive before the consumer thread attempts to acquire the synchronization primitive.

* * * * *